Nov. 7, 1933.  C. W. TODD  1,934,217
ELECTRIC LOCOMOTIVE
Filed April 9, 1931   3 Sheets-Sheet 1
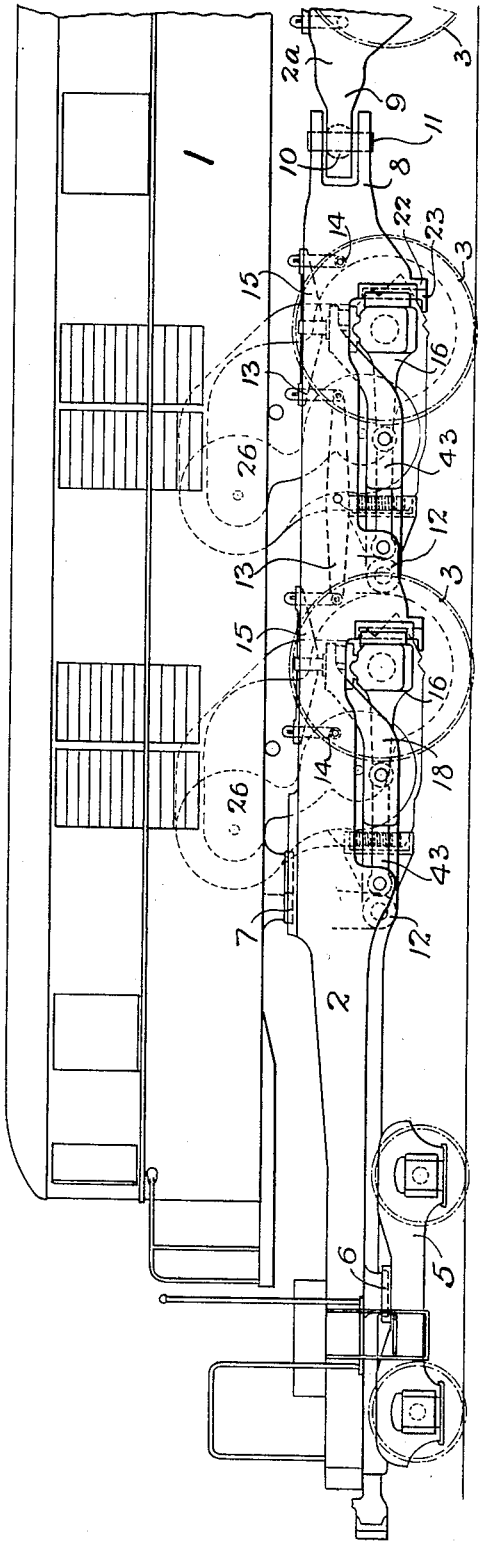
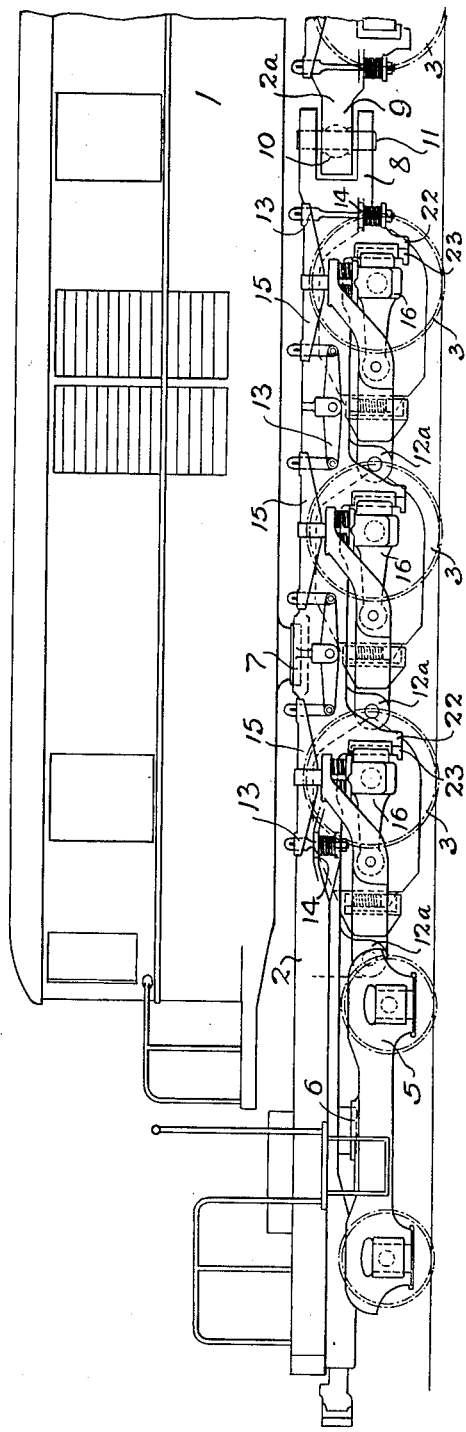
INVENTOR
Charles W. Todd.
BY
ATTORNEY Nov. 7, 1933.  C. W. TODD  1,934,217
ELECTRIC LOCOMOTIVE
Filed April 9, 1931  3 Sheets-Sheet 2
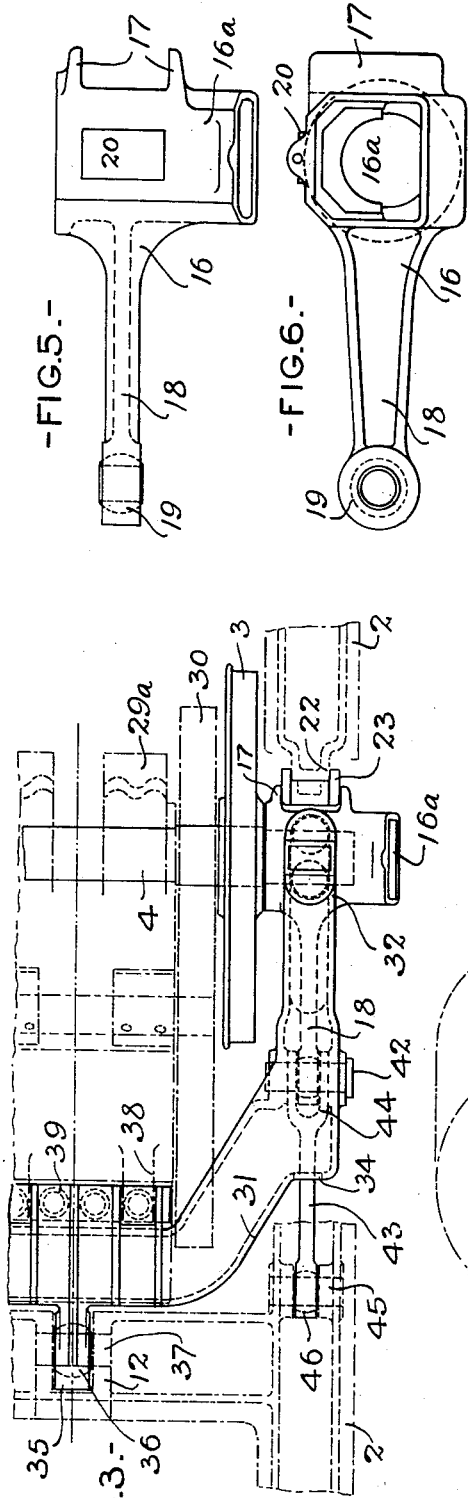
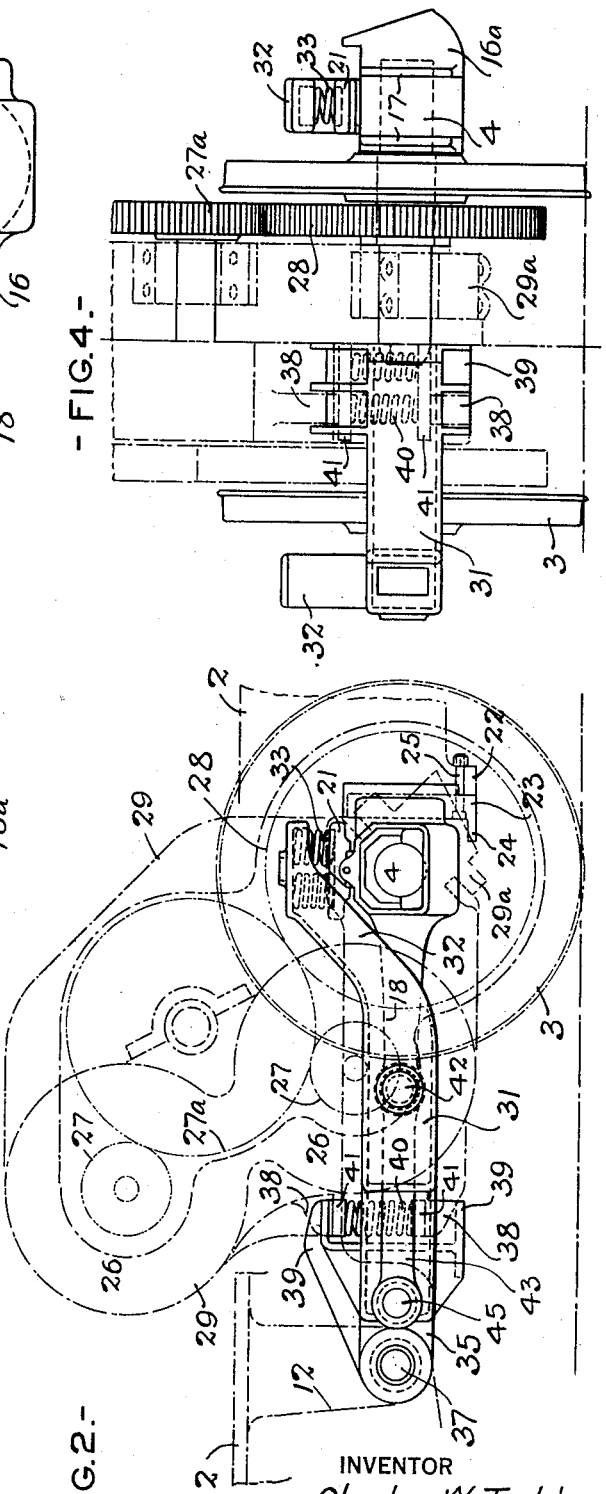
INVENTOR
Charles W. Todd.
BY
S. C. Yeaton
ATTORNEY Nov. 7, 1933.　　　　　C. W. TODD　　　　　1,934,217
ELECTRIC LOCOMOTIVE
Filed April 9, 1931　　　3 Sheets-Sheet 3
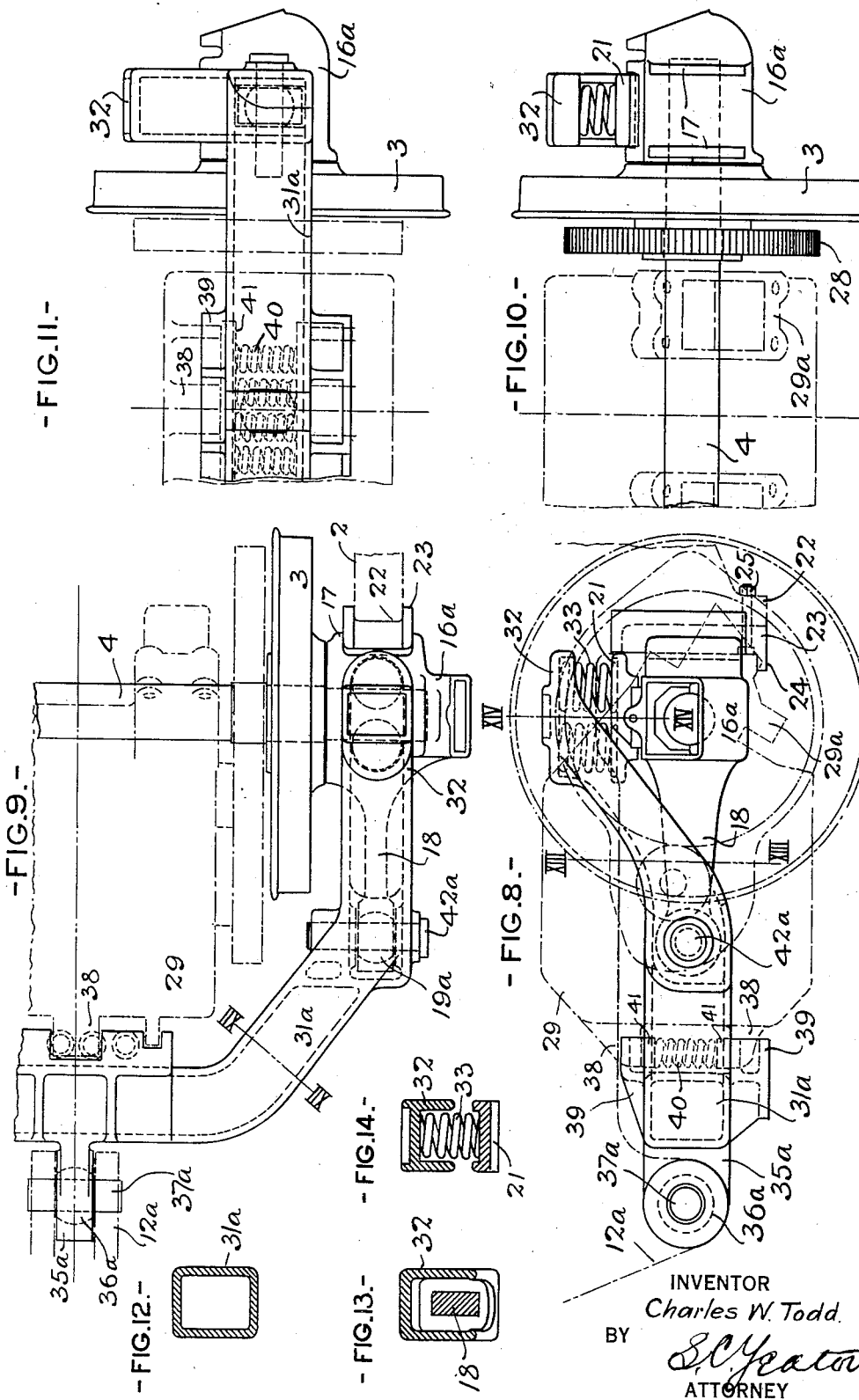
INVENTOR
Charles W. Todd
BY
ATTORNEY Patented Nov. 7, 1933

1,934,217

UNITED STATES PATENT OFFICE 1,934,217

ELECTRIC LOCOMOTIVE

Charles W. Todd, Schenectady, N. Y.; Edith E. Todd executrix of said Charles W. Todd, deceased Application April 9, 1931. Serial No. 528,766

19 Claims. (Cl. 105—175)

This invention relates to certain improvements in electric locomotives and particularly electric locomotives having independent motor trucks.

An object of the invention is to provide an improved electric locomotive having a plurality of single axle independent motor trucks.

A further object is to provide an improved independent motor truck comprising means for carrying a superimposed load and for transmitting tractive forces to a locomotive frame.

A further object is to provide an improved driving box for use on a locomotive of the character described, adapted to support a superimposed load and to transmit tractive force from an axle to the locomotive truck frame.

A further object is to provide a single axle independent motor truck which will be readily and easily engageable to and disengageable from the locomotive frame.

A further object is to provide an improved truck of the character described, so constructed that its wheels and axle together with its driving boxes will be readily and easily engageable to and disengageable from the truck frame without disturbance of the motor or its connections.

A further object is to provide an improved locomotive of the character described having a cab and having independent motor trucks, with cab supporting means interposed between the locomotive frame structure and the cab which will permit radial movement of the locomotive trucks relative to the cab.

Other objects and advantages of this invention will be apparent from the following detailed description and the appended claims.

The invention is illustrated in the accompanying drawings, wherein:—Fig. 1 is a side elevation of a part of an electric locomotive embodying the invention showing twin motor trucks; Fig. 2 is an enlarged side view of one of the trucks shown in Fig. 1; Fig. 3 is a half plan view of the truck; Fig. 4, on the right side, is an end view looking from the right, and on the left side is an end view looking from the left of Fig. 2; Fig. 5 is a plan view of one of the driving boxes; Fig. 6 is a side view of the box; Fig. 7 is a side elevation of a part of an electric locomotive embodying the invention showing single motor trucks; Fig. 8 is an enlarged side view of one of the single motor trucks; Fig. 9 is a plan view of part of a single motor truck; Fig. 10 is an end view looking from the right of Fig. 9; Fig. 11 is an end view looking from the left of Fig. 9; Fig. 12 is a sectional view of the truck frame on the line XII—XII of Fig. 9; Fig. 13 is a sectional view of the truck frame on the line XIII—XIII of Fig. 8; and Fig. 14 is a sectional view of the truck frame on the line XIV—XIV of Fig. 8.

Referring in detail to the drawings, the locomotive embodying this invention comprises a cab 1, in which may be carried electric and other kinds of equipment (not shown), all of which will be hereinafter referred to as the superimposed load. The locomotive is provided with frame sections 2 and 2a (at the left and right ends respectively, as shown in the drawings), and driving wheels 3, having axles 4. At the ends of the locomotive, guide trucks 5, of the usual four wheel type are provided, (only the left end of the locomotive being shown). The trucks are pivotally connected to the locomotive frame sections 2 and 2a by center pins 6.

The locomotive frame sections are connected to the cab for supporting the superimposed load by center pins 7, secured to the cab and adapted to fit in sockets formed in the locomotive frame sections, of the usual type and construction, thus permitting independent pivotal movement of the frame sections with relation to the cab. The inner end 8 of the left frame section 2, is bifurcated and the inner end 9 of the right frame section 2a is tongue-shaped to engage the end 8, and a ball and socket 10 is provided in the end 9. A pin 11 is passed through the end 8 and the ball and socket 10, to effect an articulation of the two sections.

Spaced pairs of truck supporting jaw members 12 are formed on the bottom of the locomotive frame and extend downwardly therefrom. On the opposite sides of the locomotive frame sections, sets of spring rigging 13 are provided, and are attached to the frame sections in the usual manner at the points 14. Equalizers are provided as part of the sets of spring rigging in the usual manner, and the leaf springs 15, of the spring rigging, are supported by the truck frames, as will be hereinafter more fully described.

The journals of the axles 4 are provided with driving boxes 16, (Figs. 5 and 6). The box portions 16a, of the driving boxes, are of the usual form and construction. On one side of the driving boxes outwardly extending vertical flanges 17 are formed, and on the opposite sides laterally extending arms 18 are formed, the arms being provided with balls and sockets 19. At the tops of the journal boxes projections 20 are provided, adapted to engage spring seats 21 hereinafter referred to in more detail.

The locomotive frame sections 2 and 2a, are provided with downwardly extending, single, spaced pedestals 22. Shoes 23 are disposed at the sides of the pedestals, and when the wheels, axles with their journals, and the driving boxes are in their assembled positions, the flanged sides of the boxes are immediately adjacent the shoes and the flanges 17 embrace the same. The inner sides of the flanges 17 are slightly inwardly tapered as in usual practice to permit relative rolling movement when curved or uneven track is being traversed. The shoes are provided with outward lower extensions 24, extending beneath the journal boxes, and are secured to the pedestals by the bolts 25. The extensions 24 are normally spaced a sufficient distance from the bottoms of the driving boxes to permit a limited vertical movement of the boxes, while the flanges prevent lateral movement of the boxes, relative to the pedestal jaws, and permit the rolling movement as aforesaid.

The following descriptions refer to single trucks but it will be understood that all of the motor trucks of each locomotive will be similarly constructed.

Referring particularly to the twin motor truck construction illustrated in Figs. 1 to 4, motors 26 are suitably connected, by gear wheels 27, to transmission gears 27a which in turn mesh with gears 28 fixed to the axle 4. The motors and gears are provided with suitable housing 29 and 30, respectively, the motor housing having a cap 29a, embracing the axle 4, in the usual manner, the motors being thus connected at their right ends as shown in the drawings (Figs. 2 to 4) to the axle, and supported thereon.

The truck frame 31 comprises an integral substantially U-shaped hollow casting (Fig. 3). It is box-shaped in cross section (Fig. 12) and its ends 32 extend upwardly and over the driving boxes. It will be understood that the sections shown in Figs. 12 to 14 inclusive apply to the similar parts of the construction illustrated in Figs. 1 to 4, as well as to the construction illustrated in Figs. 7 to 10. The bottom portions of the upwardly extending ends 32 are open (Fig. 13) to permit the arms 18 of the driving boxes to extend within the hollow of the walls of the frame, as hereinafter more fully described. Helical springs 33 provided with the seats 21 are disposed between the tops of the driving boxes and the bottoms of the ends 32 of the truck frames, (Figs. 2 and 14), the seats 21 engaging the projections 20 on the driving boxes. The leaf springs 15 bear upon and are supported by the ends 32 of the truck frames.

The central portion of the truck frame is provided with an outwardly projecting arm 35, which extends between the jaws 12 on the locomotive frame. The arm 35 is provided with a ball and socket 36, and a pin 37 is passed through the jaws 12 and the ball and socket 36, thereby providing a universal connection between the truck frame 31 and the locomotive frame section, which connection will permit vertical and rolling movement of the truck frame when the locomotive is passing over curved or rough track, while at the same time supporting the end of the truck frame with the attached motors.

At the left end of the motor housing 29 as shown in the drawings (Figs. 2 to 4), upper and lower spaced rows of spaced outwardly projecting lugs 38 are formed, and on the central part of the truck frame, corresponding inwardly projecting, spaced rows of spaced lugs 39 are formed, the lugs 39 interfitting between the lugs 38. Helical springs 40 are disposed between the upper and lower rows of lugs and bars 41 are interposed between the ends of the springs and the adjacent lugs. It will thus be apparent that there is afforded by the aforesaid lug spring and bar arrangement a resilient supporting means for the motors and gears which will permit limited vertical movement of the motors relative to the truck frame.

The outer ends of the driving box arms 18, extend within the hollow of the walls of the truck frame and are provided with balls and sockets 19 as aforesaid, and pins 42 are passed through the said walls of the truck frame and the said balls and sockets. Power transmission links 43, are bifurcated at their ends 44, and engage the ends of the arm 18, the pins 42, also passing through said bifurcated ends. The links 43, pass through openings 34, formed in the truck frame and their other ends are connected to the locomotive frame section by pins 45, and balls and sockets 46, which are provided in said link ends.

It will thus be seen that the driving boxes are connected to the locomotive frame section through their arms 18, and the links 43, and tractive power may be thereby transmitted from the driving boxes to the said locomotive frame section, the universal connections between the links 43, and the locomotive frame section permitting vertical and rolling movement of the truck relative to the said frame section.

It will also be seen that weight from the superimposed load of the locomotive is transmitted to the ends 32 of the truck frame which are borne by the driving boxes 16 with the springs 33 and their seats 21, interposed therebetween. The power generated by the motors is transmitted through the gears 27, transmission gears 27a, and the gears 28, to the wheels 3, and the tractive force is transmitted through the axle 4, the journal box portions 16a, the arms 18, and the links 43, to the locomotive frame section 2. As aforedescribed, the two sections 2 and 2a, of the locomotive frame are articulated together and are each pivotally connected to the cab, affording support for the superimposed load through their pivotal connections. The guide trucks 5 are pivotally connected to the frame sections through their center pins 6. The left end and right end sets of motor trucks are respectfully connected to the left and right frame sections and therefore, move radially with their respective frame sections relative to the cab when the locomotive is traversing curved track.

When it is desired to remove one of the motor trucks, as for instance one of the trucks of the construction shown in Figs. 1 to 4, this may be effected by the following steps: (1) blocking the spring rigging to temporarily support the same and jacking up the corresponding locomotive frame section to remove the load from the truck; (2) disconnecting the motor leads and taking down the brake rods that are employed in connection with said truck (these not being a part of the present invention are not described or illustrated); (3) withdrawing the pins 37 and 45; and (4) removing the motor truck unit complete with the motors in the usual manner.

When it is desired to remove a pair of wheels from one of the trucks without disturbing the motors, as for instance a pair of wheels and one of the trucks of the construction shown in Figs. 1 to 4, the same may be effected by the following steps: (1) blocking the spring rigging to temporarily support the same and jacking up the corresponding frame section to remove the load from the driving boxes and the wheels; (2) removing the driving box shoes to provide space for moving the axle and wheels longitudinally of the truck and taking down the driver brake rods that are employed in connection with the truck; (3) blocking under the motors to temporarily support the same and taking down the motor housing bearing cap and gear casings; (4) withdrawing the pin 42 and removing the cap 29a; (5) sliding the wheels and axle longitudinally along the rail a sufficient distance to disengage the motor gears and to clear the motor bearing housing; and (6) removing the wheels and axle in the usual manner.

Referring particularly to Figs. 7 to 11, there is here illustrated a truck construction embodying a single motor. The structure of this truck is substantially the same as that of the twin motor arrangement. In this instance however, the weight of the motor and the power to be transmitted thereby, are substantially less than in the twin motor construction, and the links 43 are eliminated, so that tractive power is transmitted from the axle journal 4, through the journal boxes 16 and their arms 18 to the truck frame 31a to which the arms 18 are connected by balls and sockets 19a and pins 42a, and through the truck frame to the extension 35a, to the downwardly extending jaws 12a of the locomotive frame, to which the extension is pivotally connected by the ball and socket 36a and pin 37a. The spring bearing means for the rear end of the motor housing 29, is constructed in substantially the same manner as described for the twin motor truck, there being fewer springs employed however than in the aforesaid structure, (Figs 8 and 9).

It will thus be seen that in the single motor truck the pin 37a will function not only to carry the weight of the rear end of the motor truck but also to transmit tractive force, as aforesaid to the locomotive frame. The weight of the superimposed load is transmitted to the wheels in substantially the same manner as described with the reference to the twin motor truck structure.

This truck or its axle and wheels may be removed in substantially the same manner as described with reference to the twin motor truck, in this instance however, there being no link between the driving box arm and the locomotive frame to be disengaged.

By the aforedescribed constructions there are provided novel and improved electric locomotive structures having novel and improved independent motor trucks with novel and improved journal boxes, by virtue of which, all of the objects set forth in the preamble of this specification have been attained.

It will be understood that while there has been hereinbefore described specific embodiments of this invention, the same is not to be limited thereby, but that all and any modifications and variations thereof in form, procedure, or structure, such as fall within the spirit of this invention, as defined in the appended claims, are contemplated and are to be considered as a part of this invention.

What I claim and desire to secure by Letters Patent is:

1. In an electric locomotive, a plurality of independent motor trucks, having means adapted to support a superimposed load of the locomotive; a plurality of frame sections for said locomotive, pivotally connected to each other and disposed above said trucks; and means pivotally connecting said frame sections to a locomotive superstructure.

2. In an electric locomotive, a plurality of independent motor trucks; separate means connecting said trucks in groups; said means being pivotally connected together at their adjacent ends and means for connecting said groups to a locomotive superstructure to permit pivotal movement of said groups with relation to said superstructure.

3. In an electric locomotive, a frame; an independent motor truck; means connecting said truck and said frame, and permitting relative vertical movement of said truck and frame; and a driving box providing load supporting means for said truck and having tractive power transmission means disposed on one of its sides.

4. In an electric locomotive, a locomotive frame having a pedestal; an independent motor truck; means connecting said truck to said frame, permitting relative vertical movement of said truck and said frame; and a driving box for said truck comprising means disposed on one side of said driving box engaging said pedestal for preventing lateral movement of the said driving box relative to the locomotive frame.

5. An independent motor truck, comprising a frame member having a pair of longitudinal side members and a connecting cross member; driving boxes for supporting said side members; power transmitting arms formed on said driving boxes and operatively connected to said side members; resilient means disposed between said driving boxes and said side members; and means on said cross member for connecting said truck with a locomotive frame.

6. In an electric locomotive, a locomotive frame; an independent motor truck comprising a frame member having a pair of side members and a connecting cross member; motor means connected to said truck frame; means on said cross member for connecting said truck frame to the locomotive frame for support thereby; driving boxes disposed beneath said side members for supporting said side members; means connecting said driving boxes with said truck frame for the transmission of tractive power therebetween; and means connecting said truck frame to said locomotive frame for the transmission of tractive power.

7. In an electric locomotive, a locomotive frame having a pedestal; an independent motor truck; means connecting said truck to said frame, permitting relative vertical movement of said truck and said frame; a driving box for said truck comprising means disposed on one side of said driving box engaging said pedestal for preventing lateral movement of said driving box relative to the locomotive frame; and means on the opposite side of said driving box for transmitting tractive power.

8. An independent motor truck, comprising a substantially U-shaped frame member; driving boxes engaging said frame member for supporting said frame member; separate connecting means between said driving boxes and said frame member for transmitting tractive force; and means on said frame member for connecting said frame member with a locomotive frame to provide support for an end of said motor truck and permit the transmission of tractive force to said locomotive frame.

9. In an electric locomotive, a frame structure, having a plurality of spaced pedestals; a plurality of independent motor trucks; means connecting said trucks to said frame structure; and driving boxes for said trucks providing load supporting means for said trucks, each of said boxes having flanges formed on one side thereof engaging an adjacent pedestal, and a tractive power transmission arm formed on the opposite side thereof and connected with the respective truck.

10. In an electric locomotive, a frame therefor; a cab superimposed over said frame; a plurality of guide trucks pivotally connected to said frame; and a plurality of independent single axle motor trucks operably connected to said frame.

11. In an electric locomotive, a plurality of articulated frame sections therefor; guide trucks pivotally connected to said frame sections; independent single axle motor trucks operatively connected to said frame sections; and a cab structure superimposed over said frame sections and pivotally supported thereon.

12. In an electric locomotive, a locomotive frame; an independent motor truck; means pivotally connecting said truck at one end thereof to said frame, permitting relative vertical movement of said truck and frame; a driving box for said truck; and means pivotally connecting said box at one end thereof to said truck, permitting relative vertical movement of said box and truck.

13. In an electric locomotive, a locomotive frame; an independent motor truck; means pivotally connecting said truck at one end thereof to said frame, permitting relative vertical movement of said truck and frame; a driving box for said truck; and means pivotally connecting said box at one end thereof to said truck, permitting relative vertical movement of said box and truck, said box providing load supporting means for said truck.

14. In an electric locomotive, a locomotive frame; an independent motor truck; means pivotally connecting said truck at one end thereof to said frame, permitting relative vertical movement of said truck and frame; a driving box providing load supporting means for said truck; and resilient means interposed between said box and truck.

15. In an electric locomotive, a locomotive frame; an independent motor truck; means pivotally connecting said truck at one end thereof to said frame, permitting relative vertical movement of said truck and frame; a driving box for said truck; means pivotally connecting said box at one end thereof to said truck, permitting relative vertical movement of said box and truck, said box providing load supporting means for said truck; and resilient means interposed between said box and truck.

16. In a locomotive, a locomotive frame having a pedestal; a truck operably connected to said frame; and a journal box engaging the pedestal to prevent lateral movement and to permit vertical movement, of the box relative to the frame, and pivotally secured to the truck to permit swinging vertical movement of the box relative to truck.

17. In a locomotive, a locomotive frame having a pedestal; a truck pivotally connected to said frame to permit swinging vertical movement of said truck relative to said frame; and a journal box engaging said pedestal to prevent lateral movement and to permit vertical movement, of said box relative to said pedestal, and pivotally secured to the truck to permit swinging vertical movement of the box relative to said truck.

18. In a locomotive, a locomotive frame having a pedestal; a truck pivotally connected to said frame to permit swinging vertical movement of said truck relative to said frame; and a journal box engaging said pedestal to prevent lateral movement and to permit vertical movement, of said box relative to said pedestal, and pivotally secured to the truck to permit swinging vertical movement of the box relative to said truck, said box providing load supporting means for said truck.

19. A locomotive comprising a locomotive frame; a pair of journal boxes associated with said frame to permit vertical movement and to prevent lateral movement relative to said frame; and a truck frame having one end supported on said boxes and having its other end pivotally connected to said locomotive frame, said boxes being pivotally connected to said truck frame to permit hinge movement between said truck frame and said boxes in a vertical plane.

CHARLES W. TODD.